United States Patent [19]

Sivachenko et al.

[11] 4,241,146

[45] Dec. 23, 1980

[54] CORRUGATED PLATE HAVING VARIABLE MATERIAL THICKNESS AND METHOD FOR MAKING SAME

[75] Inventors: Eugene W. Sivachenko, 6471 Riverside Dr., Redding, Calif. 96001; Firoze H. Broacha, Lakewood, Colo.

[73] Assignee: Eugene W. Sivachenko, Redding, Calif.

[21] Appl. No.: 962,365

[22] Filed: Nov. 20, 1978

[51] Int. Cl.³ .................. B32B 3/28; B32B 15/00
[52] U.S. Cl. .................................. 428/600; 72/161; 72/180; 428/124; 428/130; 428/182; 428/156; 428/577
[58] Field of Search ............. 428/167, 130, 179, 182, 428/184, 156, 600, 601, 614, 174, 577; 156/210; 72/180, 130, 161; 264/286; 29/DIG. 32; 220/442; 52/671, 630, 674, 675, 814, 425

[56] References Cited

U.S. PATENT DOCUMENTS

| | | | |
|---|---|---|---|
| 2,220,259 | 11/1940 | McPherson | 52/814 |
| 2,292,372 | 8/1942 | Gerlach et al. | 52/814 |
| 2,713,017 | 7/1955 | Bruns | 428/124 |
| 3,421,866 | 1/1969 | Palmer et al. | 428/614 |
| 3,820,295 | 6/1974 | Folley | 52/630 |
| 4,109,503 | 8/1978 | Françon et al. | 428/183 |
| 4,120,065 | 10/1978 | Sivachenko et al. | 52/796 |
| 4,128,271 | 12/1978 | Gray | 220/442 |

*Primary Examiner*—Paul J. Thibodeau
*Attorney, Agent, or Firm*—Townsend and Townsend

[57] ABSTRACT

A corrugated plate is disclosed which has trapezoidal corrugations defined by alternating, side by side, relatively thick corrugation peaks and corrugation troughs and relatively thin, inclined corrugation sides which interconnect edges of adjoining peaks and troughs. A method is also disclosed for corrugating the corrugated plate from flat sheet by providing a flat sheet with spaced apart, longitudinally extending, relatively thick sections which thereafter define the corrugation peaks and corrugation troughs or for forming the thick sections by providing a relatively thin sheet and folding over portions of the thin sheet in the areas which ultimately form the corrugation peaks and corrugation troughs so that the latter are defined by a plurality of staked sheet layers.

21 Claims, 11 Drawing Figures

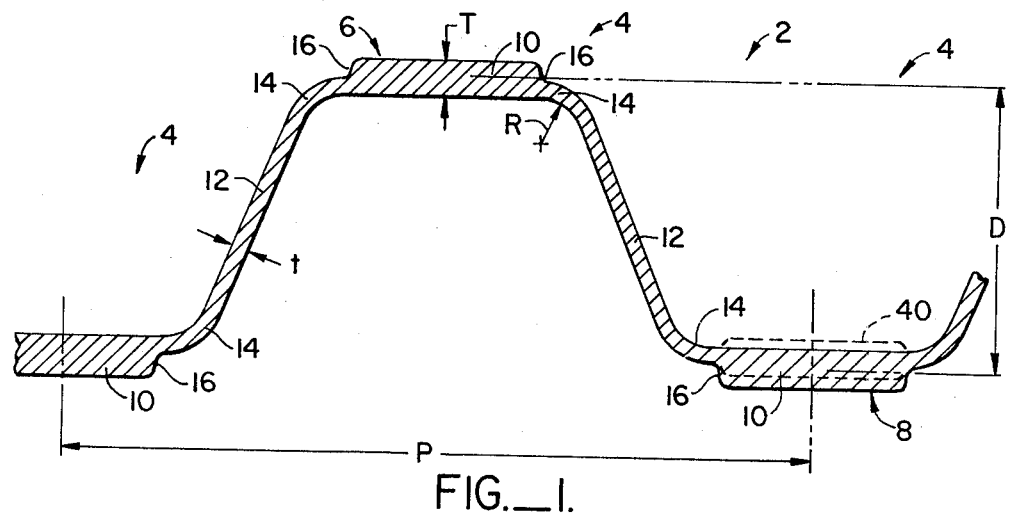
FIG._1.
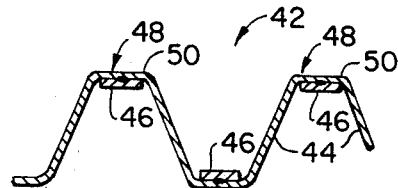
FIG._2.
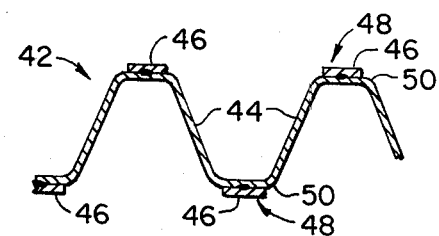
FIG._3.
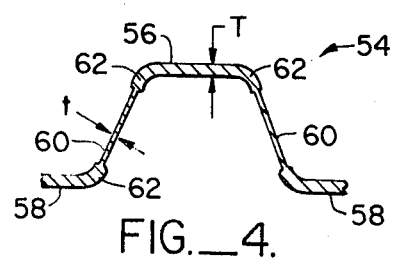
FIG._4.
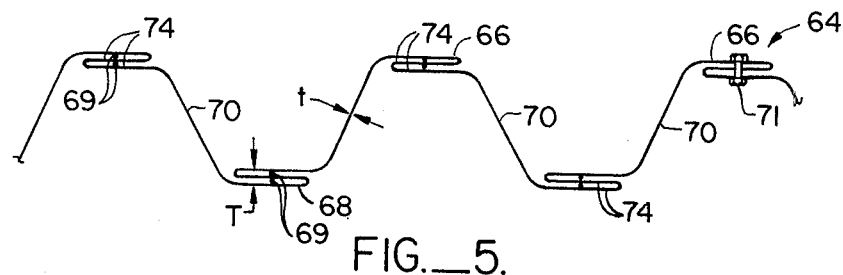
FIG._5.

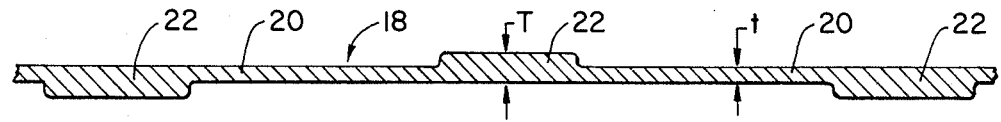
FIG._6.
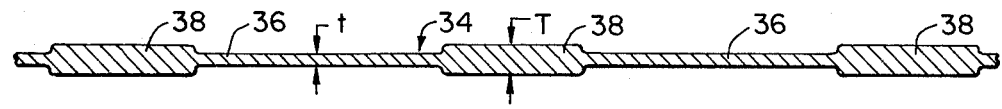
FIG._7.
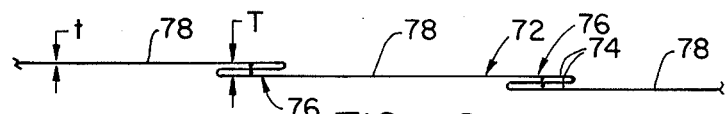
FIG._8.
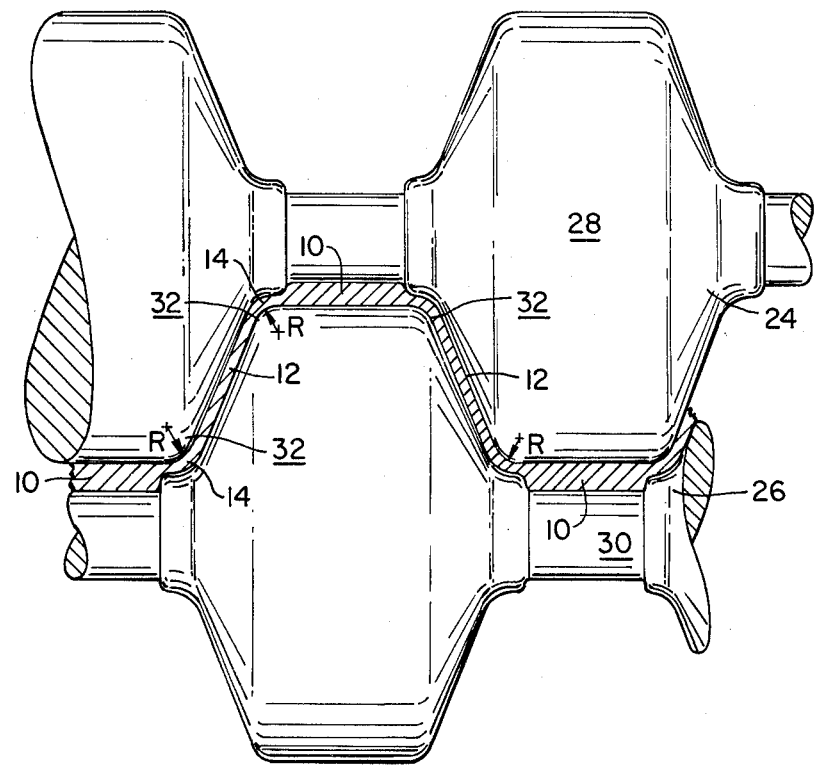
FIG._11.

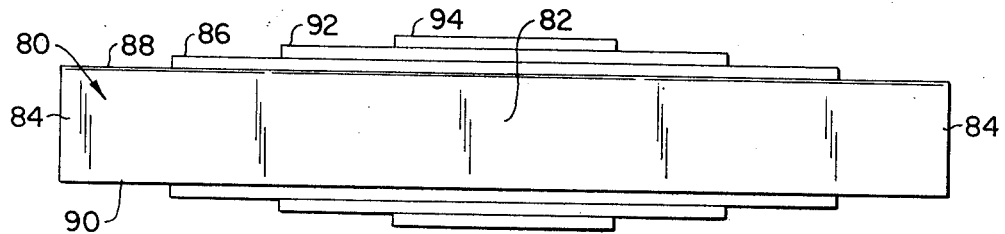
FIG._9.
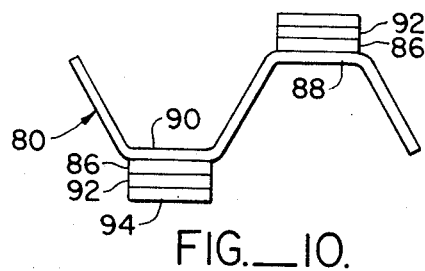
FIG._10.

CORRUGATED PLATE HAVING VARIABLE MATERIAL THICKNESS AND METHOD FOR MAKING SAME

BACKGROUND OF THE INVENTION

Corrugated plate, in all its forms, is extensively used in a variety of applications. For example, corrugated plate is widely used for making corrugated pipe or buildings as is disclosed in U.S. Pat. No. 3,820,295. Most recently, the use of corrugated plate having trapezoidal corrugations for the construction of high load bearing structures such as bridges, for example, has generated great interest. U.S. Pat. No. 4,120,065 discloses such a bridge construction which extensively employs trapezoidally corrugated plate as the main structural component of the bridge.

The use of trapezoidal corrugations, particularly for high load applications, is especially attractive since such corrugations have flat corrugation peaks and corrugation troughs located at a point farthest removed from the neutral axis of the corrugation. As is well known, both the section modulus and the moment of inertia of a given profile increases rapidly if the amount of material located reltively far from the neutral axis is increased. The trapezoidal cross section, as contrasted with the theretofore more common sinusoidally shaped cross sections accomplish this goal.

Inspite of the more efficient use of materials in trapezoidally corrugated plate there remains a fair amount of material in the normally slanted corrugation sides (which interconnect the corrugation peaks and troughs) in relatively close proximity to the neutral axis of the corrugation. This material, of course, adds little to the section modulus or the moment of inertia of the corrugation. At least as far as bending stresses are concerned, a good portion of the material in the corrugation sides is, therefore, simply deadweight. Such deadweight has heretofore been accepted as a necessary sacrifice for obtaining the many advantages that can be derived from a structural use of relatively inexpensive corrugated plate.

SUMMARY OF THE INVENTION

The present invention is specifically directed to an improved profile for corrugated plate, and particularly trapezoidally corrugated plate, so as to optimize the moment of inertia and the section modulus of a given profile utilizing a given amount of material, in other words it is directed to optimizing the strength and rigidity of corrugated plate and to enable a plate made of a given amount of material to absorb greater bending moments than was possible with heretofore available corrugated plate.

Generally speaking, the present invention accomplishes this by giving the peak and trough portions of the corrugated plate a greater material thickness than is given to the corrugation sides which interconnect the peaks and the troughs. As a result, a corrugated plate constructed in accordance with the present invention and made from a given amount of material can withstand greater bending moments or, for a given bending moment, the plate can be constructed of less material. In either case, expensive raw material, deadweight and, therefore, costs are saved.

The present invention, though generally applicable to corrugated plate, is particularly advantageous in connection with trapezoidally corrugated plate. Such plate has longitudinally extending, alternating corrugation peaks and corrugation troughs which are interconnected by sloping or slanted corrugation sides. Each of the peaks and the troughs includes a flat crown section which is parallel to the neutral plane of the plate (when the plate is otherwise flat). The crown sections have a thickness which is typically two to three times the thickness of the corrugation sides. As a result, material savings of between about 15 to 25% are possible without reducing the strength, i.e. the section modulus or the moment of inertia of the plate.

Further, the relatively thick crown sections of the peaks and the troughs can be dimensioned so that curved, longitudinally extending corrugation segments of the corrugated plate, which form the transition between the horizontal crown sections and the slanted corrugated sides, are defined by the relatively thinner material thickness of the sides, thereby greatly facilitating the ease with which such plate can be corrugated by cold rolling it from appropriately shaped flat sheet metal stock since much less metal needs to be worked and deformed. As a result, the corrugating equipment can be constructed much lighter and consumes significantly less power, thereby reducing both the initial manufacturing cost for such equipment and its subsequent operating costs. These costs translate into a corresponding reduction in the manufacturing cost for the corrugated sheet. These savings, combined with the material savings due to the more efficient use of the plate thus significantly reduce the cost of corrugated plate.

The present invention, therefore, not only relates to the above-described improved and more efficient profile of corrugated plate but further to a method of corrugating such plate. This aspect of the present invention generally contemplates to provide as a raw material substantially flat sheet which, however, has alternating, longitudinally extending, side by side relatively thin and relatively thick sections. These sections of the sheet are then corrugated so that the thick sections define the crown sections of the corrugation peaks and troughs of the corrugated plate while the thin sections define the corrugation sides which interconnect the peaks and the troughs. The corrugation step includes the step of forming a longitudinally extending curved segment in the relatively thin sections of the corrugated plate which interconnect edge portions of the crown sections with adjoining corrugation sides. By placing the curved segments in the thin sections of the plate, the above-discussed advantages of having to cold form relatively thin material (as contrasted with the thickness of the crown sections) are attained. The flat sheet may have the alternating relatively thin and relatively thick sections uniformly formed as by hot rolling steel plate to the desired profile. Alternatively, the relatively thick plate sections can be formed by initially providing a thin sheet which has a uniform thickness and by folding over through an arc of substantially 180° relatively narrow portions of the sheet so that two or more sheet material layers define the above-discussed relatively thick sheet sections. The material layers can be welded together to rigidify them. The sheet is then corrugated in the above-described manner.

Another aspect of the invention contemplates to additionally strengthen the corrugation peaks and troughs at certain points over their length, e.g. at the longitudinal center region of the corrugated plate to enhance its bending strength and rigidity.

BRIEF DESCRIPTION OF THE DRAWINGS

FIG. 1 shows the profile of a corrugated plate constructed in accordance with the present invention;

FIGS. 2–5 show the profile of corrugated plates constructed in accordance with alternative embodiments of the present invention;

FIGS. 6–8 show the cross section of flat plate from which the corrugated plate of the present invention can be formed; and FIGS. 9 and 10 illustrate the present invention as it relates to variations in the thickness of the corrugation peaks and troughs over their longitudinal extent.

FIG. 11 schematically illustrates the manner in which the corrugated plate profile shown in FIG. 1 can be cold rolled in accordance with the present invention.

DESCRIPTION OF THE PREFERRED EMBODIMENTS

Referring first to FIG. 1, a corrugated plate 2 constructed in accordance with the present invention generally comprises longitudinally extending, parallel, side by side corrugations 4 which have a generally trapezoidal cross section. The corrugations are defined by alternating, longitudinally extending and parallel corrugation peaks 6 and corrugation troughs 8 each of which has an elongated, essentially flat and relatively narrow crown section 10 of a thickness "T" which extends over the length of the respective peak or trough. Angularly inclined or slanted corrugation sides 14 have a thickness "t" and each of them interconnects a corrugation peak with an adjacent corrugation trough. A curved corrugation segment 14 extends over the length of the corrugations and forms the connection between lateral edges 16 of the crown sections and the corrugation sides.

As is apparent from FIG. 1 "T" is larger than "t," in other words, the corrugation sides are relatively thin while the crown sections of the corrugation peaks and troughs are relatively thick. Although the benefits of the present invention are attained irrespective of the ratio between "T" and "t," it is preferred that the ratio is at least 2:1 and preferably 3:1 or more. The exact dimension and resulting ratio between "T" and "t" depends on the overall size of the corrugations, the type and magnitude of loads to which the corrugated plate 2 is subjected and the need to give the corrugation sides a sufficient thickness to prevent the sides from buckling under the loads imposed on the plate.

In a particularly advantageous embodiment of the corrugated plate 2 for high load applications in which the corrugated plate has a corrugation pitch "P" of about 28 inches and a corrugation depth "D" of about 12 inches, the thickness "T" of the corrugation sides 12 is about 0.25 inches while the thickness "T" of the crown sections is about 0.75 inches. Such a corrugated plate has a cross sectional area (per corrugation pitch) of 19.01 sq. in., a weight of about 64.6 lbs. per linear foot, moment of inertia of 530.5 in$^4$ and a section modulus of 83.2 in.$^3$.

In contrast thereto, a corrugated plate constructed in accordance with prior art, i.e. one which has a constant material thickness, a like pitch "P" and corrugation depth "D," requires a material thickness of 0.515 in. This results in a cross sectional area, per corrugation pitch, of 23.07 in.$^2$ and gives the plate a comparable moment of inertia of 522 in.$^4$ and section modulus of 83.4 in.$^3$. However, such a prior art plate, which exhibits roughly the same strength as the above-discussed plate constructed in accordance with the present invention, has a weight of 78.4 lbs. per linear foot. In other words, the prior art corrugated plate requires roughly 21.5% more material than the plate of the present invention.

Comparable material savings are attained with differently dimensioned corrugated plate constructed in accordance with the present invention. For example, the corrugated plate may have a corrugation pitch "P" of 16 inches and a corrugation depth "D" of 6 inches. By giving sides 12 a thickness "t" of 0.0747 inch and the crown sections 10 a thickness "T" of 0.2242 inch, the weight saving is about 16 to 17% compared to a prior art corrugated plate since the latter must have a constant material thickness of 0.15 inch to provide a comparable moment of inertia and section modulus.

Referring now to FIGS. 1, 6 and 11, the corrugated plate 2 illustrated in FIG. 1 is constructed from a flat sheet 18 which has the desired length and a width sufficient to form the required number of corrugations. The sheet defines alternating, side by side, longitudinally extending relatively thin sheet sections 20 which have a thickness "t" equal to the desired thickness for the corrugation sides 12 and relatively thick sheet sections 22 which have a thickness "T" equal to the desired thickness of crown sections 10. The width of the thin and thick sheet sections is chosen so that when the flat sheet is corrugated into the corrugated plate 2 the thin sections define the corrugation sides 12 and the curved corrugation segments 14 while the relatively thick sheet sections 22 define the crown sections 10 of the corrugated plate.

Preferably, the actual corrugating of the flat sheet 18 is performed in corrugating equipment such as is illustrated, for example in U.S. Pat. Nos. 726,691; 3,750,439; or 3,940,965. Briefly, a flat sheet is corrugated by passing the sheet through successive, power driven roller pairs which have a periphery that is shaped to incrementally deform the sheet from its flat configuration into the ultimate corrugated shape. FIG. 11 illustrates portions of a cooperating pair of such rollers 24, 26 which have peripheries 28, 30, respectively, shaped to conform to the profile of corrugated plate 32. It will be appreciated that it is normally desirable or necessary to provide a series of such roller pairs in which the flat plate 18 is deformed in multiple steps until it reaches the ultimate profile shown in FIG. 11. It should be noted, however, that as the flat plate is deformed, the relatively thick sheet sections 22 remain flat and require no deformation. The actual material deformation takes place in the curved corrugation segments 14 provided the relatively thin sheet sections 20 have a sufficient width so that they extend from the lateral edge 16 of a corrugation peak to the lateral edge 16 of the proximate corrugation trough. For this purpose, the peripheries 28, 30 of the rollers 24, 26 include, in cross section, a curved surface 32 which has a radius of curvature "R" which is the same as the radius of curvature "R" for the inside radius of the curved corrugated segments 14.

Thus, the present invention requires the deformation of the relatively thin material of the corrugation sides only. This significantly reduces the power consumption for corrugating the plate and makes possible a lighter construction of the corrugating equipment as compared to corrugating equipment that would be necessary for prior art (constant material thickness) corrugations having a strength and rigidity comparable to that of the corrugated plate of the present invention.

From the preceding it is apparent that the present invention lowers material consumption and the deadweight of the corrugated plate as well as the manufacturing costs. Thus, the initial cost of the corrugated plate is less. In addition, where the corrugated plate of the present invention is used in vehicles or vessels the continued use of the corrugated plate is substantially less costly than the use of comparable prior art corrugated plate since less dead weight needs to be moved, thereby reducing fuel and/or other operating costs.

Referring momentarily to FIGS. 1 and 7, in an alternative embodiment, the corrugated plate 2 may be constructed of a flat sheet 34 which is again defined by relatively narrow, side by side, relatively thin sections 36 and relatively thick sections 38 having the above-discussed thicknesses "t" and "T," respectively, and which extend over the full length of the plate. However, instead of alternatingly extending the additional material thickness of the relatively thick sections of the plate in opposite directions (as is shown in FIG. 6) the sheet 34 shown in FIG. 7 is symmetric so that the additional thickness of the relatively thick sections 38 projects equally to both sides of the sheet. Upon corrugation crown sections 40 are formed as is illustrated in the righthand portion of FIG. 1 in dotted lines.

Referring now to FIGS. 2 and 3, the advantages of the present invention can be attained even in those instances in which flat plate having alternating relatively thin and relatively thick, longitudinally extending sections, (as shown in FIGS. 6 and 7) is not readily available. In such instances, the corrugated plate 42 can be conventionally corrugated from flat plate having a uniform thickness which equals the desired thickness of corrugation sides 44. Flat steel bars or strips 46 having a length equal to the length of the corrugated plate and a width equal to the width of crown sections 48 (as above defined) of the corrugation peaks 50 and trough 52 are then secured with spot welds, fillet welds or the like to the inside of the corrugations (FIG. 2) or the outside of the corrugations (FIG. 3). In this manner, both the weight savings and the increase in the strength and rigidity of the corrugated plate is attained without requiring flat plate into which the varying material thicknesses have been rolled during the manufacture of the plate.

Referring now to FIG. 4 in an alternative embodiment of the invention similar to the one illustrated in FIG. 1, but exhibiting greater strength, a corrugated plate 54 again has alternating corrugation troughs of a material thickness "T" interconnected by corrugation sides 60 of a thickness "t". The difference between corrugated plate 54 and corrugated plate illustrated in FIG. 1 lies in the fact that the relatively thicker material extends past the corrugation peaks and troughs over all or at least a portion of the curved corrugation segments 62 which interconnect lateral edges of the peaks and troughs with the adjoining corrugation sides. This profile can yield slightly greater material savings than the earlier discussed profiles of the present invention. However, it also increases the strength requirements for the corrugating equipment and its power consumption.

Referring now to FIGS. 5 and 8, in yet another embodiment of the present invention, a corrugated plate 64 again has alternating corrugation peaks and troughs 66, 68 interconnected by slanted corrugation sides 70. The corrugated plate is constructed from a flat sheet 72 having a uniform thickness throughout by folding or doubling over through an arc of 180° spaced apart strips 74 of the sheet so as to define parallel, longitudinally extending relatively thick sheet sections 76 which have a width about equal to the desired width of the corrugation peaks and troughs 66, 68 and which are interconnected by longitudinally extending bands 78 of the sheet which have a sufficient width so that the bands, upon corrugation of the sheet, define the slanted corrugation sides 70. The doubled over sheet strips 74 are rigidly secured to each other, as with spot welds 69 or fasteners 71 (such as bolts or rivets) located at intermittent points distributed over their lengths and the sheet is corrugated as above described and essentially as is shown in FIG. 9. It should be noted that the doubling over of the sheet strips 74 can be performed independently or as part of the corrugation process. Further, it should be noted that in the embodiment of the invention shown in FIG. 5 the thickness "T" of the corrugation peaks and troughs 66, 68 will always be a multiple of the material thickness "t" of the corrugation sides 70 and normally it will be an odd multiple so that the corrugation sides slope from the lateral edges of the peaks and troughs.

Referring now to FIGS. 9 and 10 in instances in which the corrugations are subjected to bending movements, as when a corrugated plate 80 forms a bridge or bridge deck and is suspended between abutments (not shown) the section modulus and the movement of inertia of the bridge at its center region 82 can be increased over those of its end sections 84 as follows. A flat steel bar 86 may be secured to the corrugation peaks and troughs 88, 90 in the same manner as is shown in FIGS. 2 and 3 and as described above. Additional flat steel bars 92, 94 are placed on top of bar 86, centered relative to the corrugated plate (see FIG. 9) and secured to the bar 86 with welds, bolts rivets or the like. In this manner the material thickness of the corrugation peaks and troughs can be arranged to vary over the length of the corrugations so as to correspond to the stresses to which the plate is subjected. As a result significant material savings can be attained.

We claim:

1. A corrugated metal plate comprising longitudinally extending, side by side, alternating corrugation peaks and corrugation troughs and corrugation sides extending between and interconnecting the peaks and the troughs, at least portions of the peaks and of the troughs having a material thickness which is greater than a material thickness of the sides, the peaks, troughs and sides being defined by a single, integral sheet.

2. A corrugated plate according to claim 1 wherein the material thickness of the peaks and the troughs exceeds the material thickness of the sides by a factor of at least about 2.

3. A corrugated plate according to claim 2 wherein the factor is at least about 3.

4. A corrugated plate according to claim 1 wherein the peaks and troughs respectively are defined by a plurality of layers of the sheet and including means rigidly securing the sheet layers at the peaks and the troughs to each other.

5. A corrugated plate according to claim 4 wherein the securing means comprises welds.

6. A corrugated plate according to claim 4 wherein the securing means comprises a fastener.

7. A corrugated plate according to claim 6 wherein the fastener comprises a bolt.

8. A corrugated plate according to claim 6 wherein the fastener comprises a rivet.

9. A corrugated plate according to claim 4 including at least two sheet layers at the peaks and the troughs.

10. A corrugated plate according to claim 9 including at least three sheet layers at the peaks and the troughs.

11. A corrugated plate according to claim 4 wherein the sheet layers have a material thickness equal to the material thickness of the sides.

12. A corrugated plate according to claim 11 wherein the sheet defines substantially 180° folds between the sheet layers secured to each other and defining the peaks and the troughs.

13. A corrugated plate according to claim 1 wherein the peaks and the troughs include substantially flat, parallel crown sections having said greater material thickness, and wherein the crown sections have a width measured transversely to the longitudinal extent of the peaks and the troughs which is less than the width of the peaks and the troughs.

14. A corrugated plate according to claim 13 wherein the corrugation sides are angularly inclined relative to the corrugation peaks and corrugation troughs, and including a curved corrugation segment extending between and interconnecting the corrugation sides with the corrugation crown sections, and wherein the material thickness of the curved segments is less than the material thickness of the crown sections.

15. A corrugated plate according to claim 14 wherein the material thickness of the curved segments equals the material thickness of the corrugation sides.

16. A corrugated metal plate made from sheet material comprising: a plurality of side by side parallel corrugations having a generally trapezoidal cross-section and defining longitudinally extending, parallel, alternating corrugation peaks and corrugation troughs interconnected by sloping corrugation sides, the peaks and the troughs each including a substantially flat crown section extending over the full length of the plate and, in a direction transversely thereto, between adjoining corrugation sides, the corrugated plate further including curved corrugation segments extending between lateral edges of the crown sections and the flat corrugation sides, the crown sections having a material thickness substantially greater than a material thickness of the corrugation sides, the crown sections, the corrugation sides, and the corrugation segments being integrally formed from the same sheet.

17. A corrugated plate according to claim 16 wherein at least portions of the curved segments have a material thickness which exceeds the material thickness of the corrugation sides.

18. A corrugated plate according to claim 16 wherein the curved segments have a material thickness less than the material thickness of the crown sections.

19. A corrugated plate according to claim 18 wherein the curved segments have a material thickness euqal to the material thickness of the corrugated sides.

20. A corrugated plate according to claim 16 wherein the crown sections are defined by a plurality of sheet layers constructed integrally with the corrugation sides, adjoining sheet layers being interconnected by a substantially 180° fold.

21. A corrugated plate according to claim 20 including means rigidly securing adjoining sheet layers to each other.

* * * * *